UNITED STATES PATENT OFFICE.

GUSTAV WENDT, OF STOLBERG, GERMANY.

COMPOSITION OF CASEIN WITH LITHIUM SALTS.

SPECIFICATION forming part of Letters Patent No. 617,210, dated January 3, 1899.

Application filed August 19, 1898. Serial No. 689,011. (No specimens.)

*To all whom it may concern:*

Be it known that I, GUSTAV WENDT, a citizen of Germany, residing at Stolberg, near Aix-la-Chapelle, Germany, have invented certain new and useful Improvements in the Manufacture of Combinations of Casein with Lithium Salts Soluble in Water, of which the following is a specification.

The present invention has for its object to produce a tasteless remedy having nutritive properties for use in the treatment of gout or similar diseases which are commonly treated with lithium waters.

It is well known that certain remedies in chemical combinations with albuminoids act most effectively and afford an easily-digested substance. According to my invention, therefore, and proceeding on this principle, I combine lithium salts with casein in the manner and proportions following, thereby presenting a compound containing the remedial properties of lithia and at the same time affording a concentrated and easily-digested food.

I have found by experiment that in order to obtain a compound which shall be soluble and neutral to phenolphthalein 2.2 parts of lithium hydrate are necessary for one hundred parts of air-dry casein. If fresh precipitated wet casein is used, quantitative changes are obtained even with difficultly-soluble or insoluble lithium salts, (trilithium phosphate.) Dry casein when triturated with dry lithium hydrate results in a product soluble in boiling water; but this mode of procedure is not recommended, for the reason that the distribution of the components is not as regular as when the change is effected with wet casein; also, the physical properties are not as good in the former case.

According to one mode of procedure one hundred parts of casein, calculated for air-dry product, are triturated with 3.5 parts of lithium carbonate while subjected to a slight heat, which is continued until the product shows the completeness of the change. Subsequently the whole mass is dried at low temperature and then ground.

According to a second mode of procedure one hundred parts of casein, calculated for air-dry product, are triturated with 3.5 parts of trilithium phosphate and heated for some time. Subsequently this mass is treated with alcohol, ether, or with a similar-acting fluid.

According to a third mode of procedure one hundred parts of air-dry or an analogous amount of wet casein are triturated with 2.2 parts of lithium hydrate in an aqueous solution and subsequently dried at low temperature and ground.

Having thus described the nature of this invention and the best means I know of carrying the same into practical effect, what I claim is—

As a new manufacture, a dry, pulverized or granulated compound of casein and lithium salts, soluble in water, substantially as described.

In testimony whereof I have hereunto set my hand in presence of two subscribing witnesses.

GUSTAV WENDT.

Witnesses:
 JEAN HERKMANNS,
 F. M. BRUNDAGE.